United States Patent
Han et al.

(10) Patent No.: US 8,751,082 B2
(45) Date of Patent: Jun. 10, 2014

(54) SYSTEM AND METHOD OF IN-SITU DIAGNOSIS OF FUEL CELL HEALTH DURING VEHICLE OPERATION

(75) Inventors: Taehee Han, Farmington Hills, MI (US); Ellazar V. Niangar, Farmington Hills, MI (US); Nilesh Dale, Farmington Hills, MI (US); Kevork Adjemian, Birmingham, MI (US)

(73) Assignee: Nissan North America, Inc., Franklin, TN (US)

( * ) Notice: Subject to any disclaimer, the term of this patent is extended or adjusted under 35 U.S.C. 154(b) by 299 days.

(21) Appl. No.: 13/331,091

(22) Filed: Dec. 20, 2011

(65) Prior Publication Data
US 2013/0158757 A1      Jun. 20, 2013

(51) Int. Cl.
*H01M 8/18*      (2006.01)

(52) U.S. Cl.
USPC ................................. 701/22; 429/9

(58) Field of Classification Search
USPC ............... 701/22; 73/23.31, 23.2; 429/9, 400, 429/402, 412, 479, 502
See application file for complete search history.

(56) References Cited

U.S. PATENT DOCUMENTS

| | | | |
|---|---|---|---|
| 5,925,476 A * | 7/1999 | Kawatsu | 429/424 |
| 6,429,019 B1 | 8/2002 | Goldstein et al. | |
| 6,461,751 B1 * | 10/2002 | Boehm et al. | 429/432 |
| 7,269,993 B2 | 9/2007 | Oishi et al. | |
| 7,422,811 B2 * | 9/2008 | Yasumoto et al. | 429/431 |
| 2010/0040913 A1 | 2/2010 | Son et al. | |
| 2010/0233562 A1 | 9/2010 | Kajiwara et al. | |

OTHER PUBLICATIONS

Ghumman et al., "Online analysis of carbon dioxide from a direct ethanol fuel cell." Journal of Power Sources, vol. 194, Issue 1, Oct. 20, 2009, pp. 286-290.

Ghumman et al., "Online analysis of products from a direct ethanol fuel cell." Electrochemistry Communications, vol. 11, Issue 10, Oct. 2009, pp. 1877-1880.

* cited by examiner

*Primary Examiner* — Dalena Tran

(74) *Attorney, Agent, or Firm* — Young, Basile, Hanlon & MacFarlane, P.C.

(57) ABSTRACT

Disclosed herein are systems and methods of diagnosing in situ the health of a fuel cell stack while it is in operation in a vehicle. One such system of diagnosing in situ the health of a fuel cell stack while it is in operation in a vehicle comprises at least one gas sensor configured to detect a gas in exhaust from the fuel cell stack and a control unit configured to receive data from the gas sensor. The control unit has baseline data particular to a catalyst of the fuel cell stack and is programmed to determine information from the baseline data and the data from the gas sensor, the information providing a condition of the fuel cell stack. A display unit is configured to display an indication of the condition.

20 Claims, 9 Drawing Sheets

SYSTEM AND METHOD OF IN-SITU DIAGNOSIS OF FUEL CELL HEALTH DURING VEHICLE OPERATION

TECHNICAL FIELD

The invention relates to the field of systems and methods for measuring fuel cell performance, and in particular to measuring catalyst performance of a fuel cell in-situ.

BACKGROUND

Fuel cells efficiently and electrochemically convert fuel into electric current, which may then be used to power electric circuits, such as drive systems for vehicles. A fuel cell containing a proton exchange membrane is an electrochemical device that converts chemical energy to electrical energy using hydrogen as fuel and oxygen/air as oxidant. A typical proton exchange membrane fuel cell is generally composed of five layers that form a fuel cell membrane electrode assembly. The membrane electrode assembly includes a solid polymer electrolyte proton conducting membrane, two gas diffusion layers, and two catalyst layers.

Catalyst performance is directly tied to fuel cell performance. Catalyst typically has a carbon support on which a precious metal group is supported. During potential cycling, the carbon surface of the carbon support electrochemically oxidizes to form surface-bound oxides (carbonaceous species with oxygen containing functional groups like carboxyl, carbonyl, etc.) and gaseous carbon dioxide. Carbon dioxide is a product of complete oxidation processes, while surface oxides are formed from incomplete oxidation pathways. Some surface oxides, however, can be further oxidized to carbon dioxide. The oxidation of carbon results in carbon corrosion and thus carbon mass loss and decreased catalyst activity. Measuring catalyst performance and durability is a key parameter in improving the efficiency and cost of fuel cells.

SUMMARY

Disclosed herein are systems and methods of diagnosing in situ the health of a fuel cell stack while it is in operation in a vehicle. One such system of diagnosing in situ the health of a fuel cell stack while it is in operation in a vehicle comprises at least one gas sensor configured to detect a gas in exhaust from the fuel cell stack and a control unit configured to receive data from the gas sensor. The control unit has baseline data particular to a catalyst of the fuel cell stack and is programmed to determine information from the baseline data and the data from the gas sensor, the information providing a condition of the fuel cell stack. A display unit is configured to display an indication of the condition.

A method disclosed herein of diagnosing in situ the health of the fuel cell stack of a vehicle comprises detecting at least one gas in an exhaust from the fuel cell stack, collecting data of the at least one gas detected, determining a condition of the fuel cell stack with the data and preprogrammed baseline data and providing an indication of the condition to a user.

Also disclosed herein are embodiments of a vehicle having a system for diagnosing the health of a fuel cell stack. One embodiment of a vehicle having a fuel cell stack comprises at least one gas sensor positioned within the vehicle to detect a gas in exhaust from the fuel cell stack and a control unit on board the vehicle configured to receive data from the at least one gas sensor. The control unit has baseline data particular to a catalyst of the fuel cell stack and is programmed to determine a condition from the baseline data and the data from the at least one gas sensor, where the condition indicates a health of the fuel cell stack.

BRIEF DESCRIPTION OF THE DRAWINGS

The various features, advantages and other uses of the present apparatus will become more apparent by referring to the following detailed description and drawing in which.

DETAILED DESCRIPTION

An important evaluation of catalyst durability is the start-stop test or carbon corrosion test. This test evaluates the stability of the carbon support during potential cycling. The carbon support supports platinum nano-particles or other precious metals in the catalyst layer and helps electrical conductivity. The carbon corrosion test is an accelerated durability protocol that simulates the conditions in a fuel cell stack in actual start-stop vehicle operation during which the potential of the stack cycles between 1.0V (stop) and 1.5V (start). This durability protocol can be applied to both carbon-supported precious group metal (PGM) and non-precious group metal (non-PGM) fuel cell catalysts.

Figure 1A:
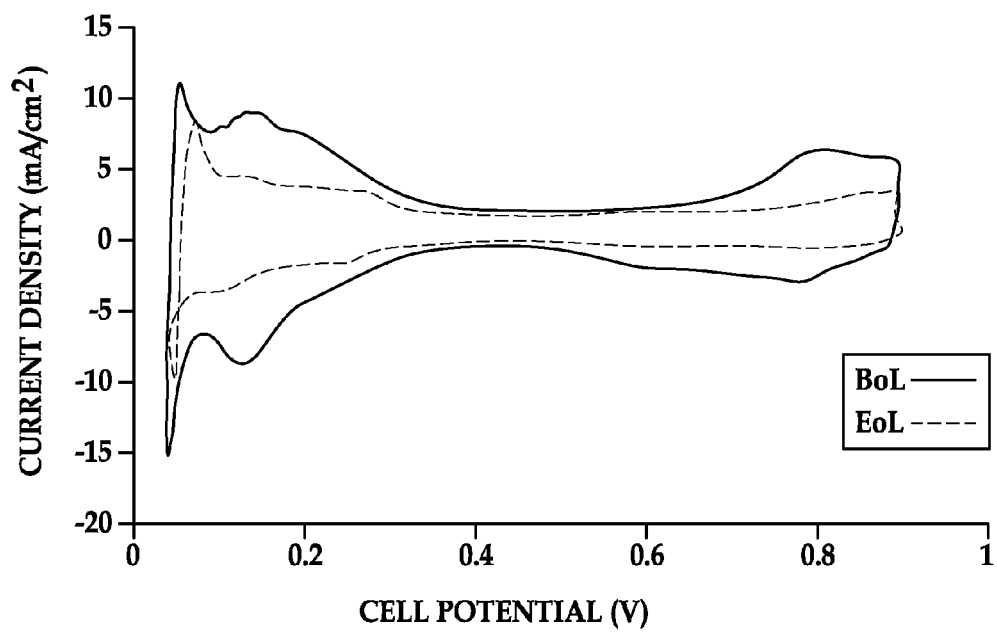
FIG. 1A is a graph illustrating the effect of carbon corrosion on fuel cell electrochemical active area.
Figure 1B:
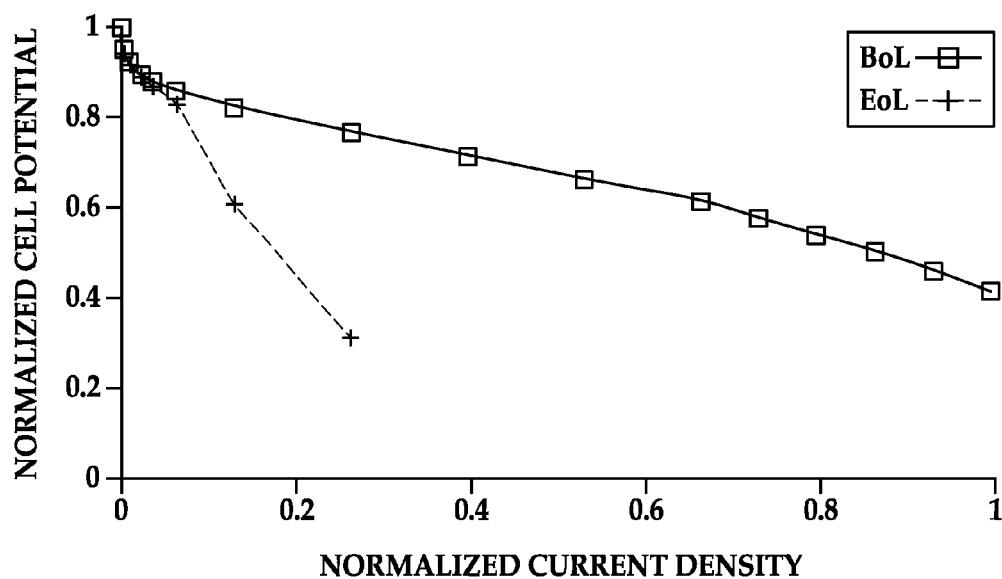
FIG. 1B is a graph illustrating the effect of carbon corrosion on fuel cell performance using normalized cell potential.

Vehicle starting and stopping deteriorates the fuel cell performance more quickly than steady state driving due to catalyst particle loss and disconnection of electrical contact. In addition, vehicle starting and stopping leads to the formation of surface oxides which make the carbon support hydrophilic, causing the carbon support to retain more water. This results in severe mass transport losses. As shown in FIGS. 1A and 1B, the carbon corrosion test simulating the vehicle starting and stopping results in significant erosion of the fuel cell electrochemical active area (using cyclic voltammetry) and fuel cell performance, respectively.

A fuel cell prior to any use has beginning of life (BOL) characteristics. As used herein, "BOL" means the performance potential of the fuel cell prior to any use. BOL can be measured using one or more characteristics such as voltage and current. As used herein, "EOL" means the point at which the fuel cell is not producing sufficient power to fully operate the device in which it is located. EOL can be measured using one or more characteristics such as voltage and current, or iV (current-voltage measuring system). The catalyst degradation information provided by the assemblies and methods herein can be used to provide a guideline for the degradation of the catalyst over the life of the fuel cell, or between BOL and EOL. In addition to providing information on optimum catalyst for use in a fuel cell, these test results can be used as a base line to determine the catalyst degradation of a fuel cell in use in a vehicle.

Figure 2:
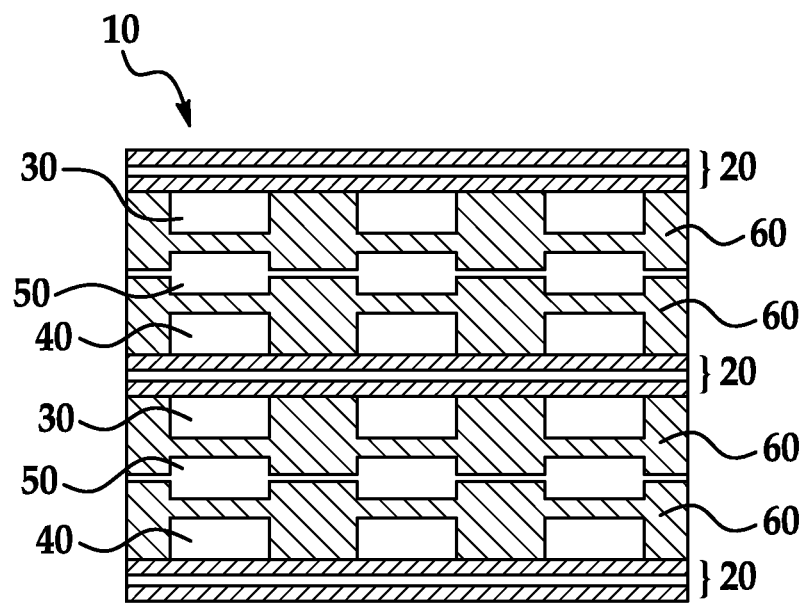
FIG. 2 is a schematic cross-sectional illustration of a basic fuel cell stack having multiple gas diffusion electrodes.

FIG. 2 shows a schematic cross-sectional illustration of a portion of a fuel cell stack 10. The illustration is provided as an example of a fuel cell and is not meant to be limiting. The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 3:
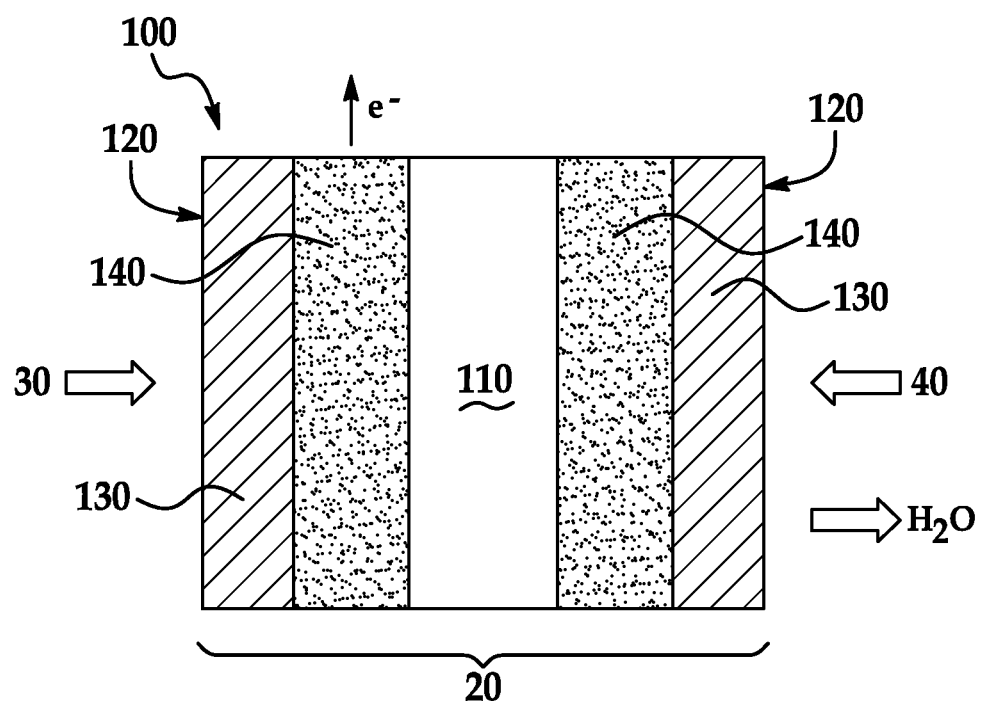
FIG. 3 is an enlarged schematic cross-sectional view of a membrane electrode assembly from the fuel cell stack of FIG. 2.

FIG. 3 is an illustration of one of the plurality of fuel cells 100 in the fuel cell stack 10. The fuel cell 100 is comprised of a single membrane electrode assembly 20. The membrane electrode assembly 20 has an electrolyte membrane 110 with a gas diffusion electrode 120 on opposing sides of the membrane 110. Each gas diffusion electrode 120 has a gas diffusion layer 130 on which a catalyst layer 140 is formed. Alternatively, the catalyst layers 140 can be formed directly on the membrane 110 and sandwiched with two gas diffusion layers 130. When fuel 30, such as hydrogen gas, is introduced into the fuel cell 100, the catalyst layer 140 splits hydrogen gas molecules into protons and electrons. The protons pass through the membrane 110 to react with the oxidant 40, such as air, forming water ($H_2O$). The electrons ($e^-$), which cannot pass through the membrane 110, must travel around it, thus creating the source of electrical energy. The gas diffusion layer 130 serves as a current collector that allows ready access of fuel 30 and oxidant 40 to the anode and the cathode catalyst surfaces, respectively.

Figure 4:
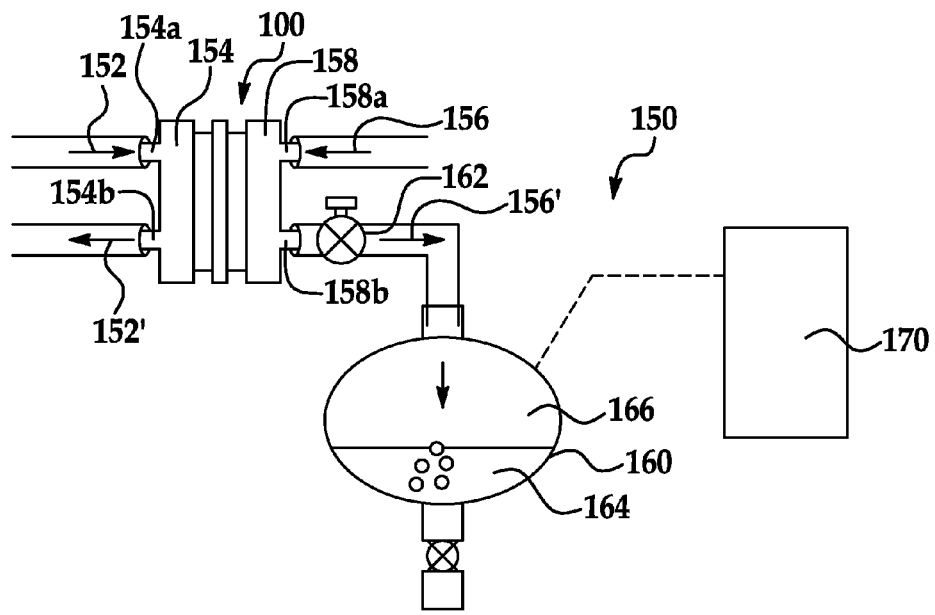
FIG. 4 is a schematic of an embodiment of a catalyst degradation detection assembly.

FIG. 4 illustrates an embodiment of an in-situ catalyst degradation detection assembly 150 disclosed herein set up to monitor a fuel cell 100. Humidified hydrogen 152 is fed to an anode 154 of a fuel cell 100 such as that described with reference to FIG. 3 through anode supply line 154a. Humidified nitrogen 156 is fed to a cathode 158 of the fuel cell 100 through cathode supply line 158a. Nitrogen can be used as the gas rather than oxygen or air when simulating the on/off cycling of the fuel cell 100 for durability testing. Hydrogen 152' exits the anode 154 through anode exhaust line 154b and nitrogen 156' exits the cathode 158 through cathode exhaust line 158b. The nitrogen 156' is fed directly to a collection cell 160. A pressure regulator 162 may be used at the cathode exhaust line 158b to regulate the pressure entering the collection cell 160. This set up is provided for illustration purposes. The hydrogen 152' exiting from the anode exhaust line 154b can be fed directly to the collection cell 160 if one desires or requires to test the catalyst degradation of the anode 154 rather than the cathode 158.

The collection cell 160 contains a level of liquid 164. Means for detecting a gas 170 is used to test either the dissolved gas in the liquid 164 or the gas 166 above the liquid 164 depending on the method of detection used. For example, carbon dioxide may be the gas that is being monitored. The means for detecting the gas 170 can be a dissolved carbon dioxide meter configured to test the dissolved gas in the liquid 164 in the collection cell 160. As another example, to test for carbon dioxide, the liquid 164 can contain one or more of a base such as barium hydroxide, sodium hydroxide, potassium hydroxide, calcium hydroxide or magnesium hydroxide and the means for detecting the gas 170 can be a titration kit for titrating the liquid 164. As another non-limiting example, to test for carbon dioxide, the liquid 164 can be ultra-pure water and the means for detecting the gas 170 can be a conductivity meter configured to measure conductivity of the liquid 164 due to the dissolved gas. As used herein, the term "degradation" includes both corrosion of the catalyst as well as contamination of the catalyst, depending on the gas to be detected. For example, carbon dioxide levels in the exhaust can indicate degrees of corrosion of the catalyst, whereas sulfur dioxide levels in the exhaust can indicate degrees of contamination.

Figure 5:
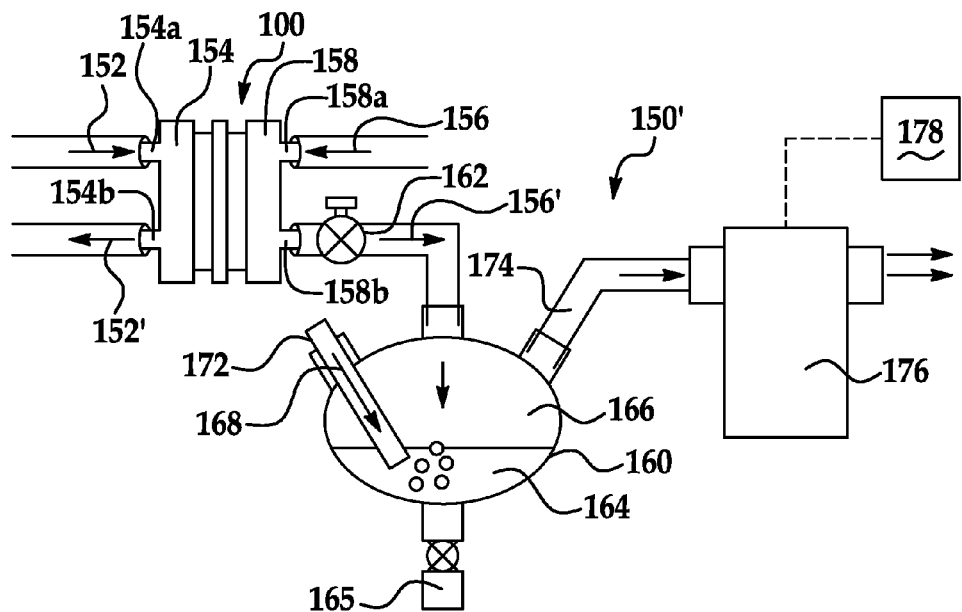
FIG. 5 is a schematic of another embodiment of a catalyst degradation detection assembly.

FIG. 5 illustrates an embodiment of an in-situ catalyst degradation detection assembly 150' disclosed herein set up to monitor the gas 166 exhausted from the fuel cell 100 and collected in the collection cell 160. Humidified hydrogen 152 is fed to an anode 154 of a fuel cell 100 such as that described with reference to FIG. 3. Humidified nitrogen 156 is fed to a cathode 158 of the fuel cell 100. Hydrogen 152' exits through the anode exhaust line 154b and nitrogen 156' exits through the cathode exhaust line 158b. The exhaust (including nitrogen 156') from the cathode exhaust line 158b is fed directly to a collection cell 160. A pressure regulator 162 may be used at the cathode from the fuel cell 100 to regulate the pressure entering the collection cell 160. As above, this set up is provided for illustration purposes. The exhaust from the anode exhaust line 154b can also be collected in the collection cell 160.

The gas 166 is exhausted through an outlet 174 in the collection cell 160 that is in communication with a gas detector 176. For example, the gas detector 176 can be a non-dispersive infrared sensor specific to the gas that is to be measured. As a non-limiting example, the non-dispersive infrared sensor can be configured to measure carbon dioxide, carbon monoxide, methane or sulfur dioxide. The assembly 150' can further have a data logger 178 in communication with the gas detector 176 to log data from the gas detector 176 and store for future use. For example, the data logger 178 may store the data on a computer or other memory device. A display may also be used to display the data in various forms, i.e. graphs, during the detection procedure.

The collection cell 160 contains a level of water 164. Dry nitrogen 168 is continuously bubbled through the water 164 with a sparging tube 172 during testing. The sparging prevents the gas that is to be measured from dissolving in the water 164. The collection cell 160 can have a drain 165 so that the water level 164 is maintained below a predetermined amount to prevent carryover of water into the gas detector 176. The water level 164 will increase as the fuel cell is cycled due to the water in the exhaust gas condensing.

Figure 6:
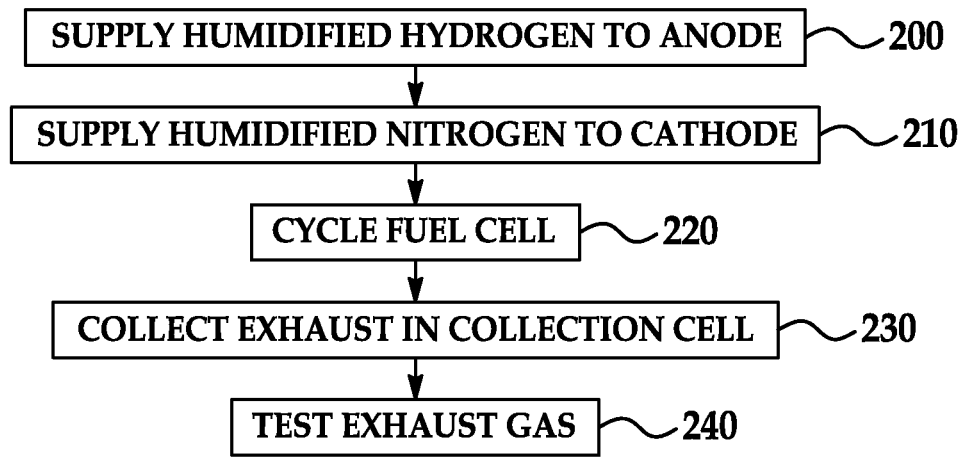
FIG. 6 is a flow diagram of a method of measuring fuel cell catalyst degradation as disclosed herein.

FIG. 6 illustrates a method of detecting a gas in situ exhausted from a fuel cell for detecting catalyst degradation. In step 200, humidified hydrogen 152 is supplied to an anode 154 of a fuel cell 100. The fuel cell 100 has a membrane electrode assembly 120. Humidified nitrogen 156 is supplied to the cathode 158 of the fuel cell 100 in step 210.

The fuel cell 100 is cycled in step 220 to simulate start-stop operation of the fuel cell 100 when it is used, as a non-limiting example, in a vehicle. The cycling of the fuel cell 100 can be controlled by an external potentiostat, for example. As the fuel cell 100 is cycled, the exhaust gas from one of the cathode 158 or anode 154 is continuously collected in the collection cell 160 in step 230. A pressure regulator 162 can be located in the exhaust line to the collection cell 160 to adjust the pressure in the collection cell 160. The connection of the exhaust line (154b or 158b) to the collection cell 160 should have a tight seal so that no exhaust gas is lost. The collection cell 160 can have a drain 165 so that the liquid level 164 can be maintained at a desired level to either dissolve the gas to be detected or to remove excess water from the exhaust gas before testing. The gas to be detected in the exhaust of the fuel cell 100 is detected in one of the liquid 164 or collected gas 166 above the liquid 164 with a gas detector 170 in step 240.

The gas detector 170 is used to test either the liquid 164 or the gas 166 above the liquid 164 depending on the method of detection used. For example, carbon dioxide may be the gas that is being monitored. The gas detector 170 can be a dissolved carbon dioxide meter configured to test the liquid 164 in the collection cell 160. As another example, to test for carbon dioxide, the liquid 164 can contain a base, such as barium hydroxide, and the means for detecting the carbon dioxide can be a titration kit, including buret, flask and reactant used to titrate the liquid 164. As another non-limiting example, to test for carbon dioxide, the liquid 164 can be ultra-pure water and the means for detecting the carbon dioxide can be a conductivity meter configured to measure conductivity of the liquid 164 due to the dissolved gas.

Figure 7:
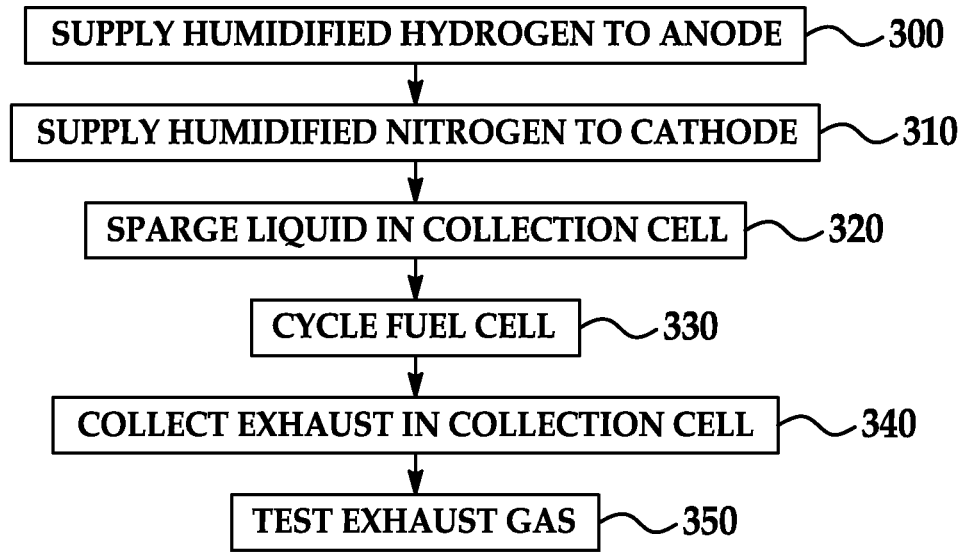
FIG. 7 is a flow diagram of another method of measuring fuel cell catalyst degradation as disclosed herein.

Another embodiment of a method of detecting fuel cell catalyst degradation in-situ as disclosed herein is shown in FIG. 7. In step 300, humidified hydrogen 152 is supplied to the anode 154 of the fuel cell 100 having a membrane electrode assembly 120. Humidified nitrogen 156 is supplied to the cathode 158 of the fuel cell 100 in step 310. In step 320, the liquid 164 in the collection cell 160, here being water, is continuously bubbled with dry nitrogen 168 during the duration of the test with a sparging tube 172. Bubbling dry nitrogen 168 in the water 164 in the collection cell 160 minimizes carbon dioxide dissolution that is in the collected gas 166 into the water 164.

In step 330, the fuel cell 100 is cycled to simulate start-stop operation of the fuel cell 100 when it is used, as a non-limiting example, in a vehicle. The cycling of the fuel cell 100 can be controlled by an external potentiostat, for example. As the fuel cell 100 is cycled, the exhaust gas from one of the cathode 158 or anode 154 is continuously collected in the collection cell 160 in step 340. For illustration, the exhaust gas from the cathode 158 is collected in the collection cell 160. The collected gas 166 exits the collection cell 160 through a tightly sealed outlet to the gas detector 176, which is configured to measure the gas of interest in step 350. A water trap can be located in the outlet line to the gas detector 176 to prevent moisture from reaching the gas detector 176. The collection cell 160 can have a drain 165 to remove excess water from the collection cell 160 to maintain a predetermined water level.

To obtain accurate measurement of the gas to be detected, a base line can be established prior to cycling the fuel cell 100. The exhaust gas of the cathode 158 should contain near zero ppm of the gas to be detected prior to cycling of the fuel cell 100, so the base line should be near zero ppm.

Carbon dioxide is one of the gases that can be measured to quantify catalyst degradation of the fuel cell 100. Carbon dioxide can be accurately measured using a non-dispersive infrared sensor, for example. The amount of carbon dioxide detected, in units of ppm, can be displayed in real-time on a screen and can be logged in a memory device such as a computer. The carbon dioxide detector can measure carbon dioxide in predetermined periods of time and as often as every two seconds. As soon as potential cycling of the fuel cell 100 begins, some carbon dioxide is formed due to carbon corrosion of the catalyst. The carbon dioxide measurements will increase during the test. Towards the end of potential cycling, the carbon dioxide measurement begins to decrease and goes back to the baseline levels again as the carbon in the catalyst degrades to the point that little or no carbon remains available to become oxidized.

The assemblies and methods disclosed herein provide an economical, accurate, low maintenance, portable test that enable real-time gas detection and measurement. Carbon dioxide detection in fuel cell exhaust can provide valuable information to optimize many aspects of the fuel cell. For example, the corrosion resistance and stability of different carbon support materials used in catalyst can be tested. The direct measurement of the carbon dioxide allows for back calculating an actual percentage of catalyst degradation over any number of cycles. The effect of different catalyst loadings and catalyst types on the durability of the carbon support can be tested since it has been speculated that the catalyst metal, such as platinum, accelerates carbon corrosion of the carbon support.

An example of a method described above was performed on a single fuel cell with a 25 $cm^2$ active area membrane electrode assembly. The method was being used to detect carbon dioxide exhaust from the fuel cell. The membrane electrode assembly is prepared using either a non-PGM or a PGM catalyst, gas diffusion layers and a membrane. In the example, an NRE211 membrane is used. Both non-PGM and PGM catalysts are tested. During the test, fully humidified hydrogen and fully humidified nitrogen, each at 0.5 nlpm and 80° C., are supplied to the anode and cathode of the fuel cell respectively. The cell potential is controlled by an external potentiostat, simulating the starting and stopping of a vehicle on the fuel cell. The cathode exhaust is connected to a collection cell containing a small amount of water. Dry nitrogen gas is continuously bubbled through the water using a sparging tube to minimize carbon dioxide dissolution in the water. The collection cell has a single outlet that is connected to a carbon dioxide detector. In order to protect the carbon dioxide detector from water/moisture carried in the fuel cell exhaust gas, appropriate traps are positioned at the carbon dioxide detector inlet.

Figure 8:
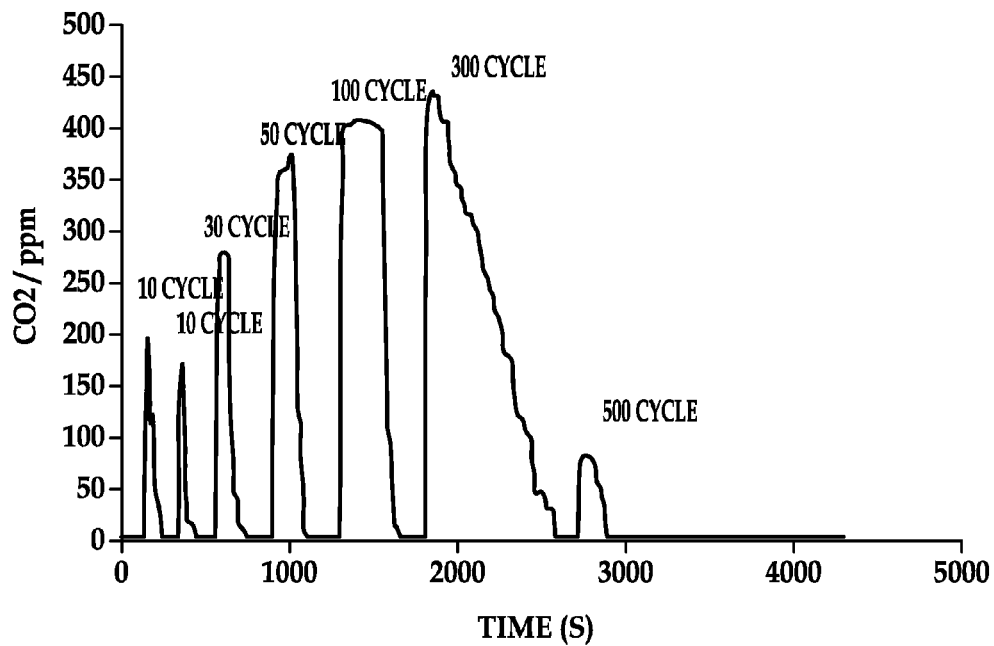
FIG. 8 is a graph of carbon dioxide detection for non-PGM catalyst fuel cell.
Figure 9:
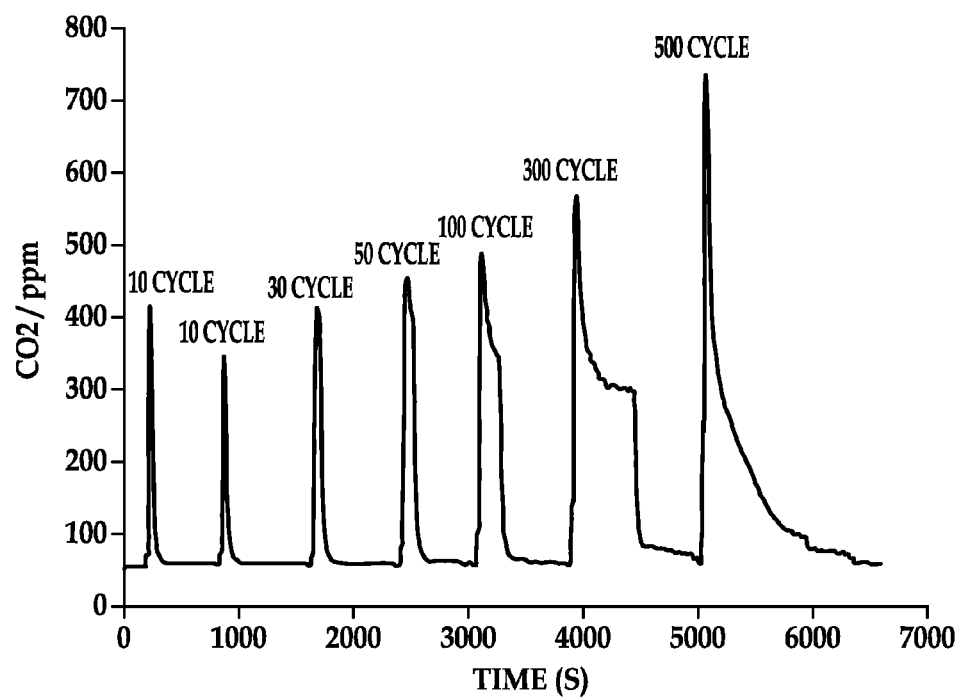
FIG. 9 is a graph of carbon dioxide detection for PGM catalyst fuel cell.

Before potential cycling begins, the carbon dioxide reading is almost zero ppm because only nitrogen gas reaches the carbon dioxide detector. As soon as potential cycling commences, some carbon dioxide is formed due to carbon corrosion, and the carbon dioxide reading begins to increase. In this example, carbon dioxide was measured every two seconds. Towards the end of potential cycling, the carbon dioxide begins to decrease and goes back to baseline levels again (~0 ppm). The data from these examples are shown in FIGS. 8 and 9, with FIG. 8 showing the data for non-PGM catalyst and FIG. 9 showing the data for PGM catalyst. The fuel cell with the non-PGM catalyst was cycled over 1000 times. As shown, the carbon dioxide amount increases with time until the catalyst reaches its end of life, wherein the carbon dioxide levels decrease. This is likely because the surface of the carbon support of the catalyst is oxidized, so less and less carbon dioxide is released. A similar trend is seen in FIG. 9 for the fuel cell using the PGM catalyst.

The carbon dioxide detector is connected to a computer so that the data logging capability will store the carbon dioxide data collected. The amount of carbon dioxide detected, in units of ppm, is displayed in real-time. The carbon dioxide detector used is a non-dispersive infrared (NDIR) sensor, a spectroscopic device used for molecule-specific gas detection. The main components of this type of detector are: (1) an infrared (IR) source (IR light emitter), (2) a sample chamber, (3) a wavelength filter, and (4) an infrared detector. The carbon dioxide concentration in the sample chamber can be determined because carbon dioxide absorbs IR light with a specific wavelength. The IR beam goes through the sample chamber and reaches the detector. The wavelength filter positioned before the detector masks all light except those with a wavelength that carbon dioxide can absorb. Other gas molecules do not absorb IR light with such wavelength so they do not affect the amount of light reaching the detector. The intensity of IR light that reaches the detector is quantitatively related to the concentration of carbon dioxide in the sample chamber. The wavelength filter can be changed to detect other gases, such as carbon monoxide, methane and sulfur dioxide.

Figure 10:
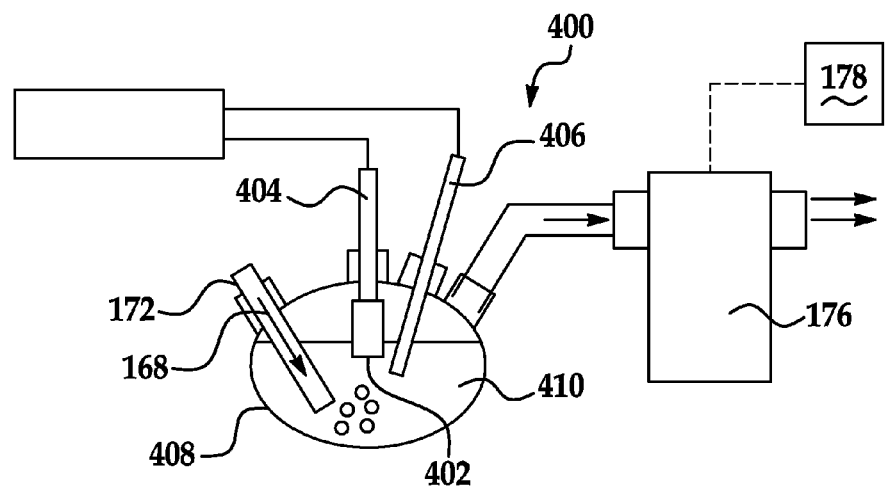
FIG. 10 is a schematic of another embodiment of a catalyst degradation detection assembly.

Variations on the assemblies and methods disclosed herein can also be used to detect and monitor gases such as carbon dioxide in a half-cell assembly such as a typical rotating disk electrode (RDE) set-up 400 as shown in FIG. 10. In the RDE set-up 400, small amounts of carbon-supported catalyst 402 are immobilized on the rotating disk electrode 404. The rotating disk electrode 404 and a reference electrode 406 are inserted into a reactor 408. The end of the rotating disk electrode 404 with the catalyst 402 is submerged in an electrolyte 410 in the reactor 408. The rotating disk electrode 404 and the reference electrode 406 are connected to a potentiostat to simulate the start-stop cycling on the catalyst 402 used in a fuel cell, such as a fuel cell powering a vehicle. A sparging tube 172 can be used to bubble dry nitrogen 168 into the electrolyte 410. The gas detector 176 can be attached to an outlet of the reactor 408 so that small amounts of gas to be detected that are formed during potential cycling can be detected and monitored. The RDE set-up 400 can further have a data logger 178 in communication with the gas detector 176 to log data from the gas detector 176 and store for future use. For example, the data logger 178 may store the data on a computer or other memory device. A display may also be used to display the data in various forms, i.e. graphs, during the detection procedure.

Also disclosed herein are systems and methods of diagnosing in situ the health of a fuel cell stack during its use in a vehicle. As mentioned, the start-stop operation of a vehicle aggressively deteriorates the fuel cell membrane assembly during actual vehicle operation. This catalyst carbon degradation can also occur, as non-limiting examples, when the vehicle experiences global or local fuel starvation, when gas crossover occurs, and when gas leaks from the supplying line. When any of these occur, the voltage of the fuel cell spikes, indicating degradation of the carbon in the fuel cell's membrane electrode assemblies. The degradation can be one or both of in the catalyst layer and in the micro-porous layer in the gas diffusion media.

The systems and methods of diagnosing in situ the health of a fuel cell stack in operation in a vehicle disclosed herein can be used or performed on a fuel cell stack in a vehicle without removing or disassembling the fuel cell stack. The system can be installed on the vehicle for continuous detection of catalyst degradation. The system can be installed during manufacture or can be installed after market. The fuel cell stack does not need to be removed from the vehicle. The systems and methods utilize the fuel gas that is provided to the fuel cell stack from the vehicle's fuel gas tank. The systems and methods can be used by drivers, manufacturers and maintenance/repair facilities to prevent damage or further damage to the fuel cell stack by monitoring one or more gases exhausted from the fuel cell stack to determine the health or condition of the fuel cell stack based on data that has been gathered using the test assemblies and methods disclosed herein for the particular catalyst or membrane electrode assembly used in the fuel cell stack.

Figure 11:
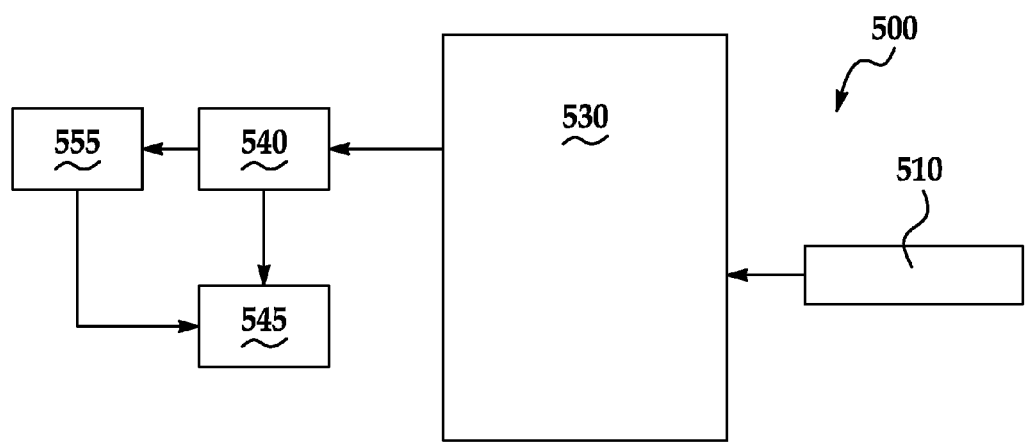
FIG. 11 is a schematic of an embodiment of a system for diagnosing in situ the health of a fuel cell stack.

One embodiment of a system 500 of diagnosing in situ health of a fuel cell stack described herein is illustrated in FIG. 11. A gas sensor 510 is configured to detect a gas in the exhaust 515 from the fuel cell stack 520 (shown in FIG. 13). The gas sensor 510 can detect carbon dioxide, carbon monoxide, methane or sulfur dioxide, as non-limiting examples. The gas sensor 510 can be of any type known to those skilled in the art that is configured to detect the requisite gas. The gas sensor 510 can be configured to be proximate the cathode exhaust or anode exhaust, or can be configured to be located on a tail pipe (generally noted as 515 in FIG. 13). A transmitter 530 is configured to send the output from the gas sensor 510 to a receiver 540. The transmitter 530 can be any type of transmitter known to those skilled in the art suitable for this application.

The receiver 540 is configured to receive the output from the transmitter 530 and display the output to one or more of a vehicle user, a manufacturer or a service facility. The receiver 540 is configured to be located anywhere desired, such as in the vehicle or at a manufacturer, maintenance or repair facility. The receiver 540 can have a display unit 545 to display the data to a user or the receiver 540 can simply collect the data for use at a later time. The data can be used to determine one or more conditions of the fuel cell stack 520, such as catalyst degradation, catalyst contamination, the need for fuel cell stack maintenance and fuel cell stack life as a percentage of EOL, as non-limiting examples. The determination can be made with a processor 555 programmed with baseline data that is developed for the specific catalyst or membrane electrode assembly used in the fuel cell stack. This baseline data is collected using one of the assemblies and methods disclosed herein. The display unit 545 can display the data from the gas sensor 510 or can display the condition as determined by the processor 555.

Figure 12:
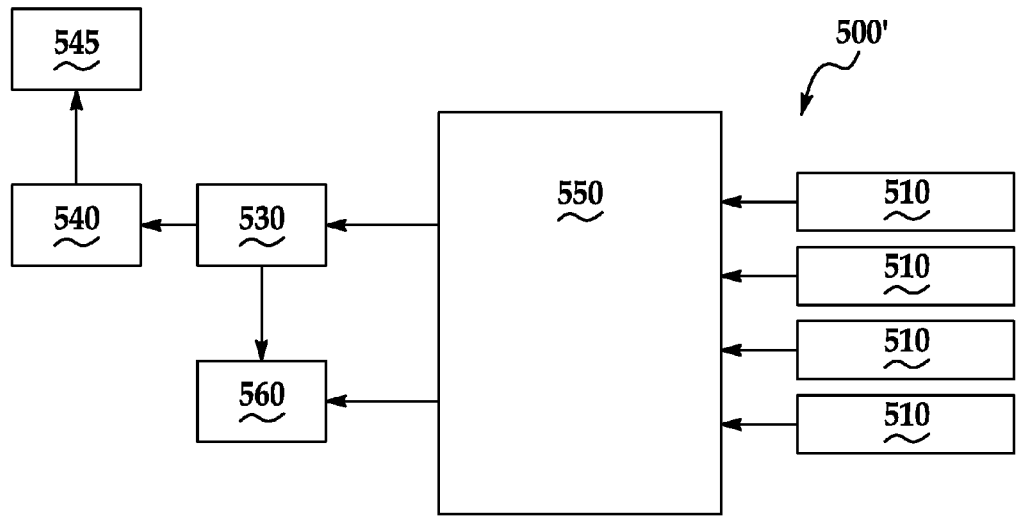
FIG. 12 is a schematic of another embodiment of a system for diagnosing in situ the health of a fuel cell stack.

Another embodiment of the system 500' of diagnosing in situ the health of a fuel cell stack is illustrated in FIG. 12. A plurality of gas sensors 510 are configured to each detect a different gas in the exhaust from the fuel cell stack 520 (shown in FIG. 13). Although four gas sensors 510 are shown, the number of gas sensors 510 can be any number desired or required. For example, if two gas sensors 510 are used, one gas sensor 510 may detect carbon dioxide, while another detects sulfur dioxide. If four gas sensors 510 are used, one of the four gas sensors 510 may detect respectively carbon dioxide, carbon monoxide, methane and sulfur dioxide.

A control unit 550 is configured to collect the data outputted from the gas sensors 510. The control unit 550 can be programmed with the baseline data collected for the particular catalyst or membrane electrode assembly used in the fuel cell stack 520 with one of the test assemblies disclosed herein. As non-limiting examples, the control unit 550 can be programmed to determine the difference between the actual data and the baseline data to determine if the catalyst is degrading faster or slower than expected. The control unit 550 can be programmed with thresholds for each gas detected such that the control unit 550 notes when a threshold is exceeded. The control unit 550 can collect and save actual data over long periods of time to profile the catalyst degradation of the fuel cell stack 520. The control unit 550 can determine where on the BOL-EOL guideline the fuel cell stack 520 is at any given time. The control unit 550 can be programmed to do one or any number of these, including other determinations from the data known to those skilled in the art, the results of which are herein referred to as "conditions." Each of these conditions indicates a health of the fuel cell stack 520.

The control unit 550 can be configured to provide the data and/or one or more conditions determined from the data directly to a display unit 560 configured to be located in a vehicle. As a non-limiting example, the display unit 560 can be configured to be located in the vehicle passenger compartment, for example, on the dash board or instrument panel. The display unit 560 may also be on a key fob or other portable device. The display unit 560 can be configured to provide a visual or audible signal or alarm 570 that can indicate when a condition exists that is negative and should be addressed. As non-limiting examples, the visual signal can be a light that turns on and stays on, flashes or changes color or written or verbal instructions (for example, instructions to bring the vehicle to the manufacturer or a maintenance/repair). The audible signal can be one or more beeps or other sounds, verbal instructions, and the like. It is also contemplated that the display unit 560 may be a driver's communication device, such as a cellular phone, with the notification being a text or a phone call.

A transmitter 530 can be configured to transmit the data and/or one or more conditions from the control unit 550 to one or more receivers 540 configured to be located remote from the transmitter 530. The transmitter 530 can also be configured to transmit to the display unit 560 located in the vehicle from the control unit 550. The transmitter 530 can transmit the information to one or more remote receivers 540 to provide the information to one or more locations remote from the vehicle. Each of the one or more receivers 540 can have a display unit 545. As non-limiting examples, the receiver 540 and/or display unit 545 can be located at a vehicle user's home, at a manufacturer of the vehicle or fuel cell stack or at a maintenance or service facility. The receiver 540 and/or the display unit 545 can be configured to save the data and/or conditions as it is received.

The display unit 545 can visually display the data in any form desired or required, such as the numerical value of the data or a graph of the data. Alternatively or in addition to the data, the display unit 545 can display the one or more conditions as they arise. The display unit 545 can be configured to provide a visual or audible signal or alarm that can indicate when the data is negative or a condition occurs and should be addressed. As non-limiting examples, the visual signal can be a light that turns on and stays on, flashes or changes color or written or verbal instructions (for example, instructions to the driver to bring the vehicle to a maintenance/repair facility or instructions to a manufacturer or maintenance facility to contact the owner of the vehicle). The audible signal can be one or more beeps or other sounds, verbal instructions, and the like. It is also contemplated that the display unit 545 can send a visual notification to an email address or send a text to the user providing instructions or indication of an alarm. Alternatively, these notifications can be sent directly from the control unit 550 or through the transmitter 530.

Figure 13:
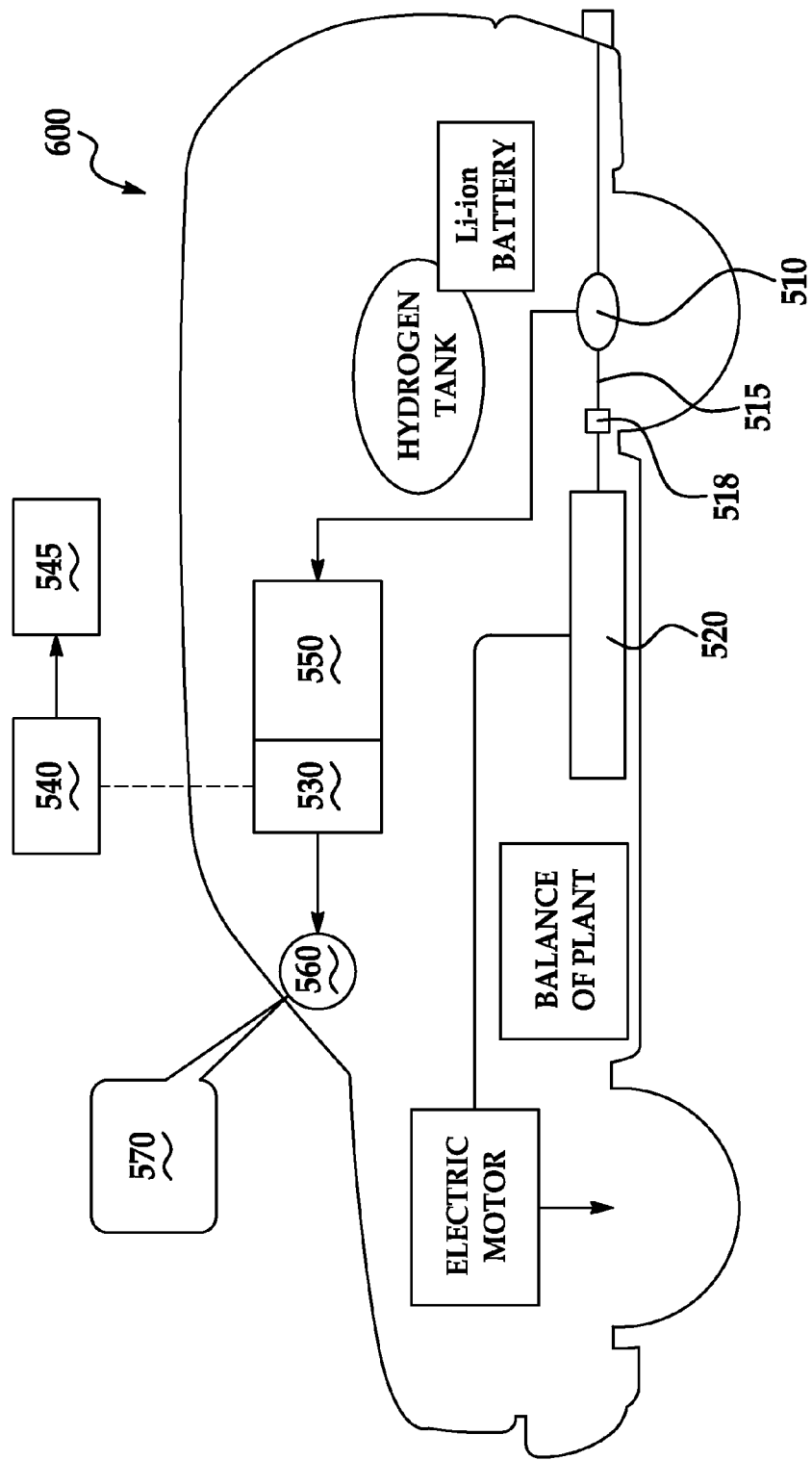
FIG. 13 is a schematic of a vehicle having a system for diagnosing in situ the health of the fuel cell stack.

FIG. 13 illustrates an embodiment of vehicle 600 having a system 500' of diagnosing in situ the health of the fuel cell stack 520. Any combination of the systems described herein can be incorporated into the vehicle 600. System 500' is used as an example.

One or more gas sensors 510 are positioned anywhere in the vehicle 600 where the gas sensors 510 come into contact with the exhaust from the fuel cell stack 520, such as in the vehicle exhaust line 515. Each gas sensor 510 is configured to detect a different gas in the exhaust from the fuel cell stack 520. A water trap 518 can be positioned upstream of the gas sensors 510 to trap water in the exhaust prior to reaching the gas sensors 510. As shown in FIG. 13, the water trap 518 is positioned on the exhaust line 515.

A control unit 550 as described above collects the data outputted from the gas sensors 510. The control unit 550 can be located anywhere in the vehicle 600 where the control unit 550 can access the gas sensor 510 output. Alternatively, an existing controller or computer in the vehicle 600 can be configured to collect the gas sensor 510 data.

The control unit 550 can provide information directly to a display unit 560 located in the passenger compartment of the vehicle 600 to provide the information to the driver as discussed above. A transmitter 530 transmits the information to one or more remote receivers 540 to provide the information to one or more locations remote from the vehicle 600. The display unit 560 can also receive the information from the transmitter 530 rather than directly from the control unit 550. The transmitter 530 is located within the vehicle 600. The transmitter 530 can be part of the control unit 550 or can be a separate unit.

The vehicle 600 can include a system with both the in-vehicle display unit 560 and one or more remote receivers 540, only the in-vehicle display unit 560, or only the one or more remote receivers 540 as desired or required.

Each of the one or more receivers 540 can have a display unit 545. As non-limiting examples, the receiver 540 and/or display unit 545 can be located at a vehicle user's home, at a manufacturer of the vehicle or fuel cell stack or at a maintenance or service facility. The receiver 540 and/or the display unit 545 can be configured to save the data and/or the one or more conditions as they are received.

The display unit 545 can visually display the data in any form desired or required, such as the numerical value of the data or a graph of the data. Alternatively or in addition to the data, the display unit 545 can display the one or more conditions as they arise. The display unit 545 can be configured to provide a visual or audible signal or alarm that can indicate when the information is negative and should be addressed. As non-limiting examples, the visual signal can be a light that turns on and stays on, flashes or changes color or written or verbal instructions (for example, instructions to the driver to bring the vehicle to a maintenance/repair facility or instructions to a manufacturer or maintenance facility to contact the owner of the vehicle). The audible signal can be one or more beeps or other sounds, verbal instructions, and the like. It is also contemplated that the display unit 545 can send a visual notification to an email address or send a text to the user providing instructions or indication of an alarm. Alternatively, these notifications can be sent directly from the control unit 550 or through the transmitter 530.

Figure 14:
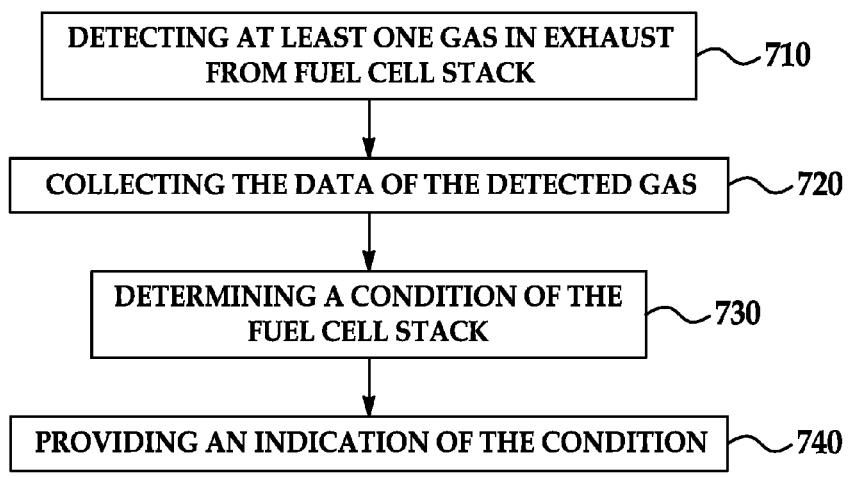
FIG. 14 is a flow diagram of a method of diagnosing the health of the fuel cell stack as disclosed herein.

Methods of diagnosing in situ the health of a fuel cell stack of a vehicle are also disclosed herein. One method is illustrated in FIG. 14. At least one gas is detected in an exhaust from the fuel cell stack 520 in step 710. As a non-limiting example, the gas to be detected can be one or more of carbon dioxide, carbon monoxide, methane or sulfur dioxide. The data from the gas sensors 510 is collected in step 720. As non-limiting examples, the data can be collected in a control unit 550 or a receiver 540. The data can be collected by a transmitter 530 and transmitted to one or more of the receivers 540. A condition of the fuel cell stack is determined from the data and preprogrammed baseline data previously determined for the particular catalyst or membrane electrode assembly used in the fuel cell stack 520 in step 730. In step 740, an indication of the condition can be provided by presenting the data, condition, or a warning message. The data, conditions and/or messages can be provided to a user by displaying the data, condition, or message on a display device 545, 560 as a non-limiting example. When the condition occurs, an alarm can be provided to one or more of the vehicle user, the manufacturer or a maintenance facility.

Figure 15:
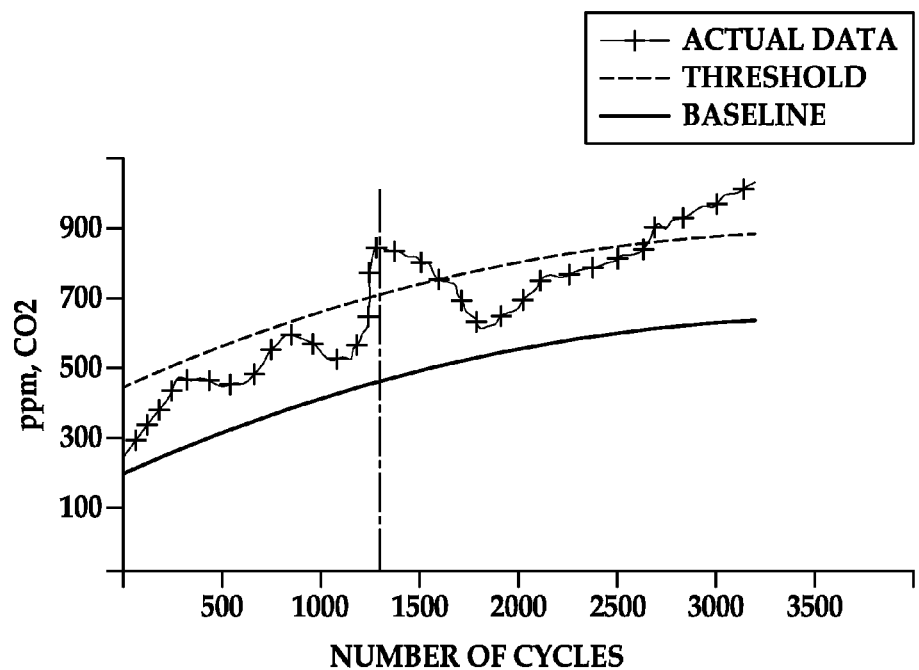
FIG. 15 is a graph illustrating the use of the baseline data to determine when a condition exists.

The baseline data can be a threshold value of acceptable gas level detected, such that if the gas level detected is greater than the threshold value, the control unit 550 would indicate the occurrence of a condition. FIG. 15 is an example of how the data and conditions may be charted. The baseline data can represent the data collected during testing of a fuel cell for carbon dioxide using an assembly and method as described herein. Based on this data, a threshold level is determined within which the carbon dioxide is considered to be at an acceptable level. During operation of the vehicle, the actual carbon dioxide levels can be recorded. As shown in FIG. 15, a condition occurs around 1560 cycles. A repair likely occurred, such as the catalyst recovery process as disclosed in U.S. application Ser. No. 13/210,827, and the carbon dioxide levels dropped back to acceptable levels. At about 2700 cycles, the fuel cell stack is likely at EOL as the carbon dioxide levels are over the threshold and continue to increase.

Figure 16:
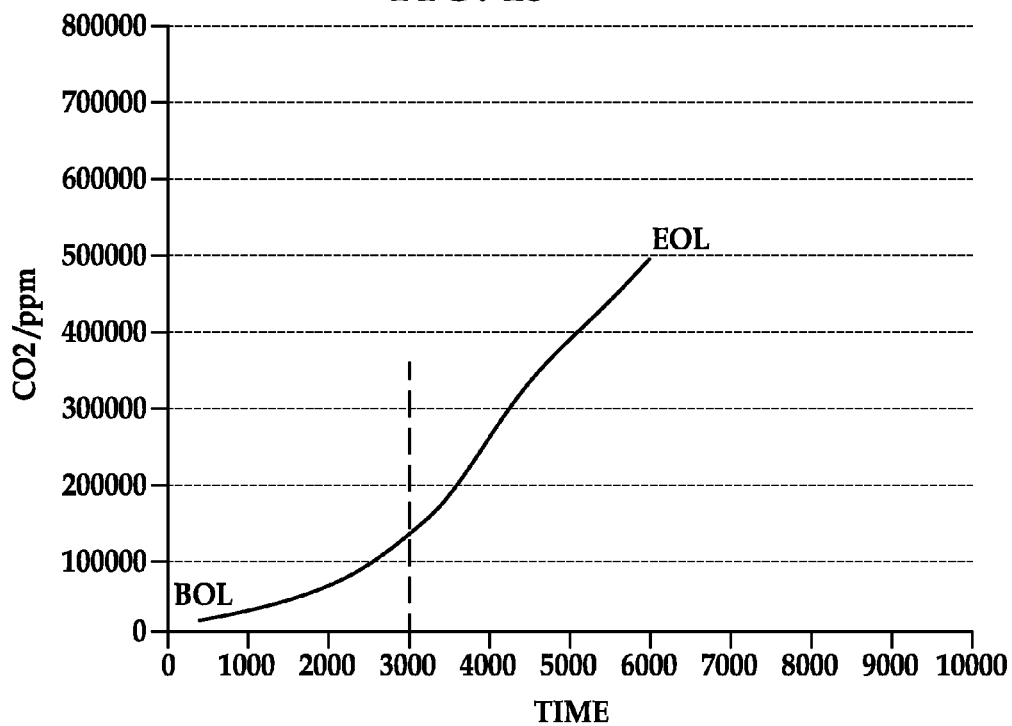
FIG. 16 is a graph illustrating the total accumulated carbon dioxide released from the fuel cell over time.

The baseline data can be the total accumulated carbon dioxide over time, as shown in FIG. 16, based on testing of the same catalyst used in the fuel cell stack 520. The detection of the gas and collection of data can be initiated when the fuel cell stack is at BOL, such as when the vehicle is new, and monitored until EOL of the fuel cell stack 520 or any other period of time. The condition of the fuel cell stack 520 can be determined by comparing the total amount of carbon dioxide detected, corresponding to the amount of carbon lost from the catalyst, to the data collected for that type of catalyst, as shown in FIG. 16. By comparing the total carbon dioxide detected to the baseline data, the amount of life remaining or used can be determined for the fuel cell stack 520, barring abnormal events that accelerate EOL. As non-limiting examples, if 200,000 ppm of carbon dioxide has been detected, the fuel cell stack 520 will have slightly over half of its life remaining. If the fuel cell stack 520 has operated for an amount of time represented by 3000, one would expect to see about 125,000 ppm of carbon dioxide collected. If the actual amount collected is significantly higher than 125,000 ppm, it is an indication that the catalyst is degrading more quickly than it should under normal conditions. The fuel cell stack 520 can then be repaired or replaced.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for diagnosing in situ a health of a fuel cell stack of a vehicle comprising:
    at least one gas sensor configured to detect a gas in exhaust gas from the fuel cell stack;
    a control unit configured to receive data from the at least one gas sensor, the control unit having baseline data particular to a catalyst of the fuel cell stack and programmed to determine a condition of the catalyst from the baseline data and the data from the at least one gas sensor, the condition of the catalyst indicating the health of the fuel cell stack; and
    a display configured to display an indication of the condition.

2. The system of claim 1, further comprising:
    at least one receiver; and
    a transmitter configured to transmit one or both of the data and the condition to the at least one receiver, the at least one receiver configured to display an indication of the condition in locations remote from the transmitter.

3. The system of claim 2, wherein the at least one receiver is configured to provide one or both of the data and the condition to a maintenance/repair facility.

4. The system of claim 1, wherein the at least one gas sensor is a carbon dioxide sensor and the condition is degree of catalyst degradation.

5. The system of claim 1, wherein the at least one gas sensor is a plurality of gas sensors with one of the plurality being a carbon dioxide sensor and others of the plurality being one or more of a carbon monoxide sensor, a sulfur dioxide sensor and a methane sensor.

6. The system of claim 1, wherein the display is configured to be positioned in the vehicle.

7. The system of claim 1, wherein the baseline data is a threshold level of gas detected and the control unit is further configured to determine if the data exceeds the threshold level.

8. The system of claim 7, wherein the control unit is further configured to send an alarm when the data exceeds the threshold level.

9. The system of claim 1, wherein the baseline data is current-voltage data and the control unit saves the data from the at least one gas sensor from a beginning of life of the fuel cell stack, the condition provided by the control unit being an amount of life of the fuel cell stack.

10. A method of diagnosing in situ a health of a fuel cell stack of a vehicle comprising:
    detecting at least one gas in an exhaust gas from the fuel cell stack with a gas sensor;
    collecting data with a computer of the at least one gas detected;
    determining with the computer a condition of catalyst of the fuel cell stack with the data and preprogrammed baseline data particular to the catalyst of the fuel cell stack; and
    providing an indication of the condition to a user.

11. The method of claim 10, wherein providing the indication of the condition comprises:
    displaying one or both of the data and the condition to a vehicle user in a vehicle with a display unit.

12. The method of claim 10, wherein providing the indication of the condition comprises:
    transmitting one or both of the data and the condition to one or more remote receivers.

13. The method of claim 10, wherein the at least one gas is carbon dioxide.

14. The method of claim 10 further comprising:
    signaling the condition has occurred with an alarm.

15. The method of claim 10, wherein the baseline data is a threshold level of gas detected and wherein determining a condition comprises comparing the data to the threshold level, the condition existing when the data exceeds the threshold level.

16. The method of claim 15 further comprising:
    providing an alarm when the condition occurs.

17. The method of claim 10, wherein the baseline data is current-voltage and both detecting the at least one gas and collecting data is initiated at a beginning of life of the fuel cell stack, and wherein determining the condition comprises determining an amount of life of the fuel cell stack.

18. A vehicle having a fuel cell stack comprising:
at least one gas sensor positioned within the vehicle to detect a gas in exhaust gas from the fuel cell stack; and
a control unit on board the vehicle configured to receive data from the at least one gas sensor, the control unit having baseline data particular to a catalyst of the fuel cell stack and programmed to determine a condition of the catalyst from the baseline data and the data from the at least one gas sensor, the condition indicating a health of the fuel cell stack.

19. The vehicle of claim 18, further comprising:
a display unit located in the vehicle, wherein the control unit provides an indication of the condition to the display unit.

20. The vehicle of claim 18 further comprising:
at least one receiver positioned remote from the vehicle; and
a transmitter on board the vehicle configured to transmit one or both of the data and the condition to the at least one receiver, the at least one receiver configured to display an indication of the condition.

* * * * *